(12) United States Patent
Smith

(10) Patent No.: US 8,707,199 B2
(45) Date of Patent: Apr. 22, 2014

(54) QUICK TEXT ENTRY ON A PORTABLE ELECTRONIC DEVICE

(75) Inventor: Ryan Tracy Smith, Guelph (CA)

(73) Assignee: Blackberry Limited, Waterloo (CA)

( * ) Notice: Subject to any disclaimer, the term of this patent is extended or adjusted under 35 U.S.C. 154(b) by 426 days.

(21) Appl. No.: 13/030,429

(22) Filed: Feb. 18, 2011

(65) Prior Publication Data

US 2012/0216140 A1 Aug. 23, 2012

(51) Int. Cl.
*G06F 3/048* (2013.01)

(52) U.S. Cl.
USPC ........................................................ 715/780

(58) Field of Classification Search
USPC ................. 715/780, 781, 825; 704/9
See application file for complete search history.

(56) References Cited

U.S. PATENT DOCUMENTS

| | | | |
|---|---|---|---|
| 6,895,430 B1 | 5/2005 | Schneider | |
| 7,634,732 B1 * | 12/2009 | Blagsvedt et al. | 715/712 |
| 2007/0214122 A1 | 9/2007 | Bala | |
| 2007/0282595 A1 * | 12/2007 | Tunning et al. | 704/9 |
| 2008/0244446 A1 * | 10/2008 | LeFevre et al. | 715/810 |
| 2008/0301581 A1 | 12/2008 | Baek et al. | |
| 2009/0055356 A1 | 2/2009 | Hanyu | |
| 2009/0172541 A1 | 7/2009 | Acedo et al. | |
| 2010/0036927 A1 * | 2/2010 | Saras | 709/206 |
| 2010/0175001 A1 * | 7/2010 | Lazarus et al. | 715/753 |
| 2011/0246944 A1 * | 10/2011 | Byrne et al. | 715/835 |

OTHER PUBLICATIONS

Hello Kirti : Cascading AutoComplete; http://blogs.technet.com/kirtid/archive/2007/05/17/cascading-autocomplete; As early as Apr. 29, 2010; 4 pages.
Mozilla Labs—Ubiquity; "An experimental interface based on natural language input"; http://mozillalabs.com/ubiquity/; As early as Jun. 10, 2010; 7 pages.
YubNub—Youbnub.org; A (social) command line for the web; http://yubnub.org/; As early as Jun. 10, 2010; 1 page.
Cuil; www.cuil.pt/; As early as Dec. 21, 2011; 1 page.
ALIPR: Automatic photo tagging and visual image search; www.simplr.com/; As early as Jun. 10, 2010; 1 page1.
Google Toolbar, http://www.google.com/intl/en_uk/toolbar/ie/index.html, at least as early as Aug. 24, 2009.
Vlingo—Voice to Text Applications Powered by Intelligent Voice Recognition, http://www.vlingo.com/, at least as early as Aug. 24, 2009, 2 pages.
Ubiquity (Firefox)—Wikipedia entry, http://en.wikipedia.org/wiki/Ubiquity_(Firefox), at least as early as Sep. 20, 2011, 2 pages.
Quicksilver (software)—Wikipedia entry, http://en.wikipedia.org/wiki/Quicksilver_(software), at least as early as Sep. 19, 2011, 4 pages.

(Continued)

*Primary Examiner* — Rashawn Tillery
(74) *Attorney, Agent, or Firm* — Ridout & Maybee LLP

(57) ABSTRACT

A method for quick text entry on a portable electronic device and a portable electronic device configured for the same are provided. In accordance with one embodiment, there is provided a method for quick text entry, comprising: displaying a text entry user interface within a graphical user interface, the text entry user interface element including a text entry field; receiving text in the text entry field; storing the text received in text entry field in memory in response to corresponding input.

21 Claims, 8 Drawing Sheets

(56) References Cited

OTHER PUBLICATIONS

Mueller J M: "Work Smarter With Smart Tags", Journal of Accountancy, American Institute of Certified Public Accountants, New York, US, vol. 194, No. 5, Nov. 1, 2008, pp. 1-9, XP002325787, ISSN: 0021-8448 * p. 1, line 1-p. 4, line 4; figures.

Jalbert, P. : "Quick Google Calendar Tip: Say it All in One Line", Apr. 25, 2007, XP002631802, Retrieved from the Internet: URL:http://www.googletutor.com/quick-google-calendar-tip-say-it-all-in-one-line/ [retrieved on Apr. 7, 2011] * the whole document*.

Gries T: "Wiki-Based Intranet- and Internet Search Assistant and Bookmark Sharing Tool Using Auto-Type Detection and Approximate and Regular Expression Pattern Shortcuts WIBISA", Research Disclosure, Mason Publications, Hampshire, GB, No. 488004, Nov. 10, 2004, page Complete, XP001152001, ISSN: 0374-4353 * the whole document *.

Miller et al: "From Documents to Object: An Overview of LiveDoc", Internet Citation, Apr. 1998, XP002460066, Retrieved from the Internet: URL:http://www.sigchi.org/bulletin/1998.2/ miller3.html [retrieved on Nov. 27, 2007]* p. 1, paragraph 3 p. 3, last paragraph  p. 4, paragraph 6—p. 5, 4*.

Extended European Search Report, EP 1115506837; Dated Apr. 18, 2011.

Aza Raskin: "Enso 2.0 Design Thoughts", Jan. 31, 2008, XP55001096, Humanized Weblog Retrieved from the Internet: URL:http://hunnanized.com/weblog/2008/01/31/enso-20-design-thoughts/ [retrieved on Jun. 21, 2011] * the whole document *.

Howard Melman: "Quicksilver User Manual",Verizon Jan. 10, 2009, pp. 1-127, XP55001099, Retrieved from the Internet: URL:http://mysite.verizon.net/hmelman/Quic ksilver.pdf [retrieved on Jun. 21, 2011] * p. 1-p. 17 ** p. 117-p. 119 *.

Extended European Search Report, EP 11151940.1; Dated Jul. 7, 2011.

Winnik, Arthur—Canadian Intellectual Property Office, "Examiner's Requisition" for Canadian Patent Application No. 2,768,422 dated Jan. 8, 2014.

http://web.archive.org/web/20100218160513/http://en.wikipedia.org/wiki/Spotlight_%28software%29.

* cited by examiner

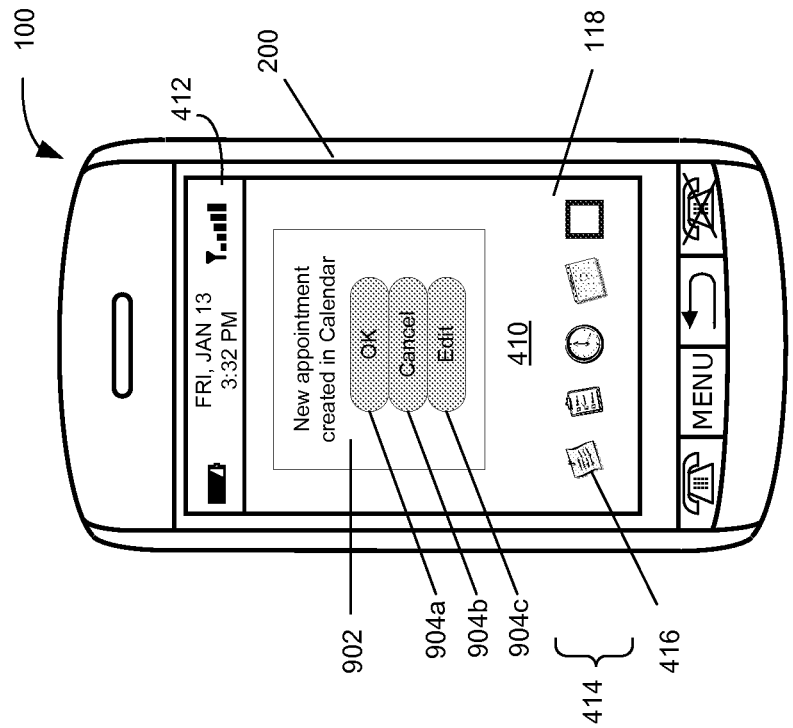
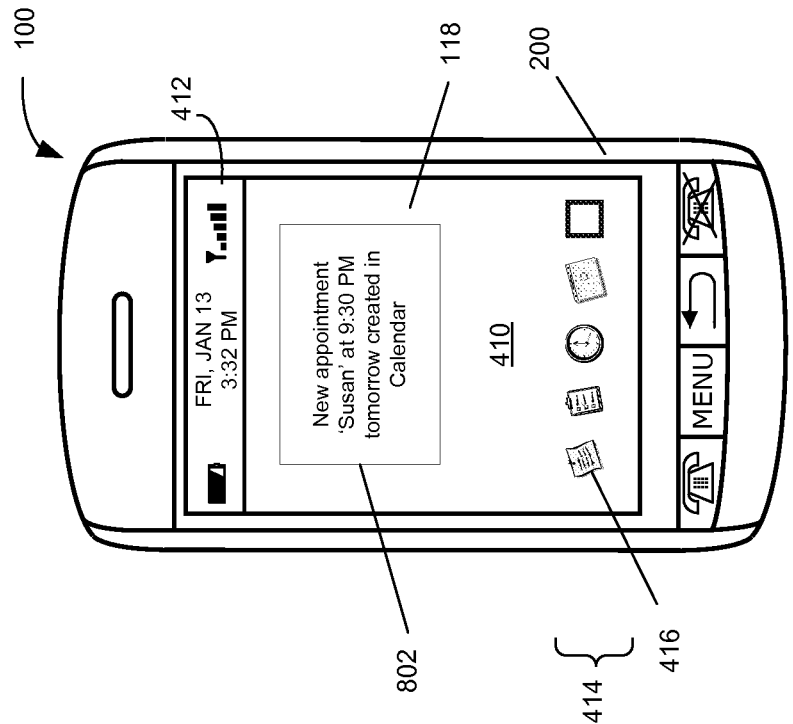

QUICK TEXT ENTRY ON A PORTABLE ELECTRONIC DEVICE

TECHNICAL FIELD

The present disclosure relates to computing devices, and in particular to a method for quick text entry on a portable electronic device and a portable electronic device configured for the same.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth™ capabilities.

Portable electronic devices such as PDAs or smart telephones are generally intended for handheld use and ease of portability. Smaller devices are generally desirable for portability. Smaller devices have smaller displays which cannot display as much information as larger displays. Designing a graphical user interface (GUI) for portable electronic devices such that the appropriate information is displayed or readily available to the user at any given time, and a size which is appropriate for the user, remains an ever-present issue.

To add new data, such as a new contact or other data item, on a portable electronic device typically requires the user to navigate through the GUI to locate the relevant application, launch the application, select a menu option to add the new data, input the data, and store the new or changed data item. This process is time consuming and cumbersome due to the menu navigation. A more efficient method for text entry on a portable electronic device is desirable.

BRIEF DESCRIPTION OF THE DRAWINGS

FIGS. 8 and 9 are front views of the portable electronic device of FIG. 2 in portrait orientation and displaying a confirmation message in accordance with example embodiments of the present disclosure.

DETAILED DESCRIPTION OF EXAMPLE EMBODIMENTS

Figure 1:
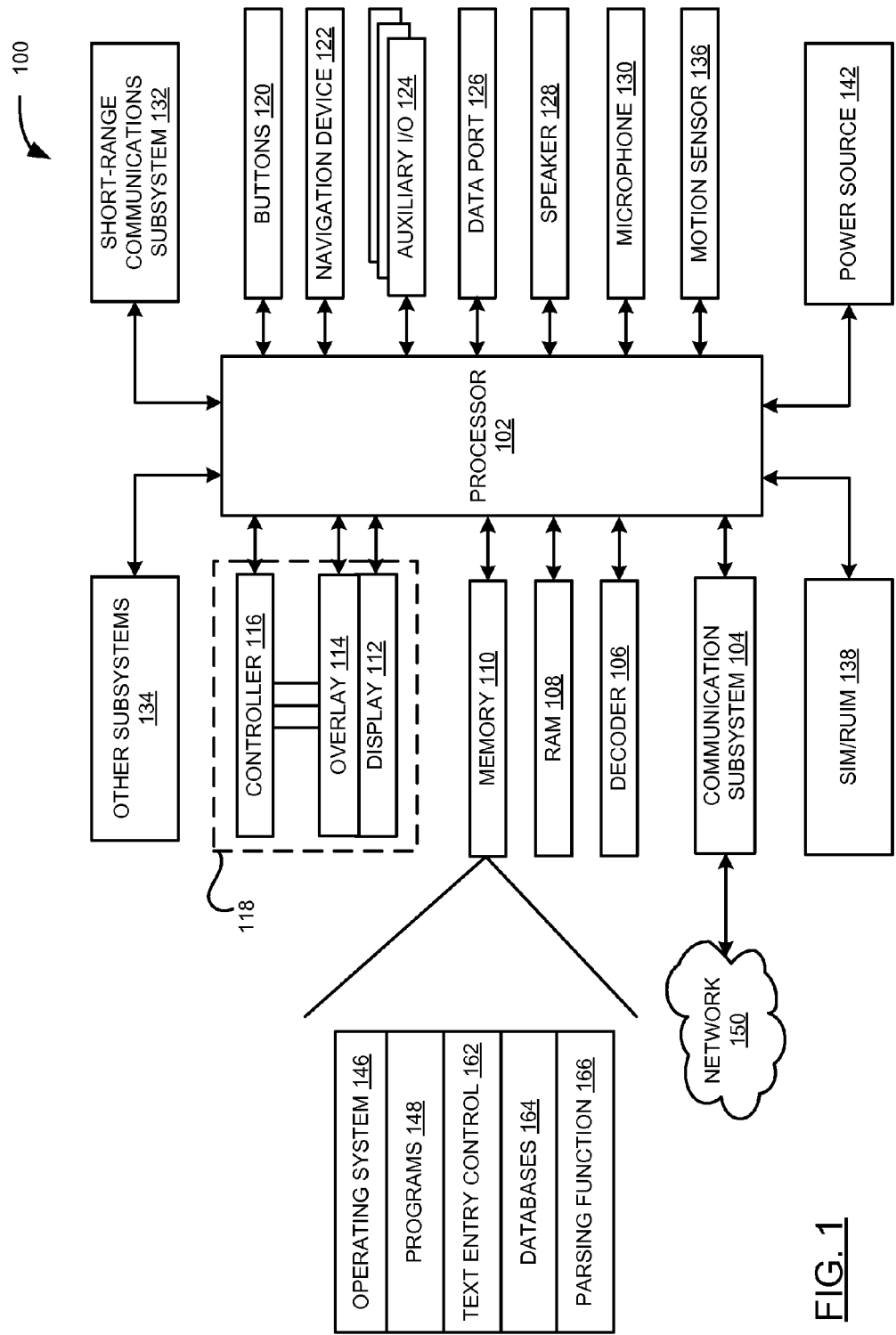
FIG. 1 is a simplified block diagram of components of a portable electronic device in accordance with one example embodiment of the present disclosure.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to a portable electronic device such as a handheld electronic device. Examples of handheld electronic devices include wireless communication devices such as, for example, pagers, mobile telephones, smartphones, tablets, slate computers, wireless organizers, personal digital assistants (PDAs), and so forth. The portable electronic device may also be a handheld electronic device without wireless communication capabilities such as, for example, an electronic gaming device, digital photograph album, digital camera, or other device.

The present disclosure provides a method of text entry on a portable electronic device which avoids, or at least reduces, menu navigation and other processing steps required to add new data on a portable electronic device. In accordance with one embodiment of the present disclosure, there is provided a method for quick text entry, comprising: displaying a text entry user interface within a graphical user interface, the text entry user interface element including a text entry field; receiving text in the text entry field; storing the text received in text entry field in memory in response to corresponding input.

In accordance with another embodiment of the present disclosure, there is provided a portable electronic device comprising: a processor; a display and memory coupled to the processor; wherein the processor is configured for performing the method(s) set forth herein.

In accordance with another embodiment of the present disclosure, there is provided a portable electronic device comprising: a display; a processor coupled to the display; wherein the processor is configured for performing the method(s) set forth herein.

In accordance with a further embodiment of the present disclosure, there is provided a computer program product comprising a computer readable medium having stored thereon computer program instructions for implementing a method on an electronic device, the computer executable instructions comprising instructions for performing the method(s) set forth herein.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 (such as a liquid crystal display (LCD)) with a touch-sensitive overlay 114 operably connected to an electronic controller 116 that together comprise a touch-sensitive display 118, a navigation device 122, one or more auxiliary input/output (I/O) subsystems 124, a data port 126, a speaker 128, a microphone 130, short-range communications subsystem 132, and other device subsystems 134. User-interaction with the GUI is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device 100, is displayed on the touch-sensitive display 118 via the processor 102.

Figure 2:
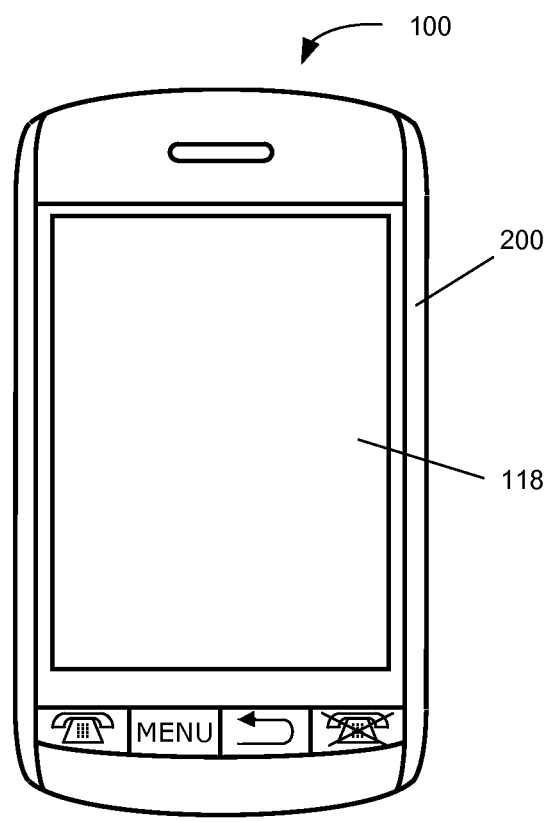
FIG. 2 is a front view of an example of a portable electronic device in a portrait orientation.

The navigation device 122 may be a depressible (or clickable) joystick such as a depressible optical joystick, a depressible trackball, a depressible scroll wheel, or a depressible touch-sensitive trackpad or touchpad. FIG. 2 shows the navigation device 122 in the form of a depressible optical joystick. The auxiliary I/O subsystems 124 may include other input devices such as a keyboard and/or keypad (neither of which is not shown). In some embodiments, a conventional a non-touch-sensitive display, such as an LCD screen, may be provided instead of the touch-sensitive display 118 along with a keyboard and/or keypad.

The portable electronic device 100 also comprises a motion detection subsystem (not shown) comprising at least one motion sensor 136 which is coupled to the processor 102 and which is controlled by one or a combination of a monitoring circuit and operating software. The motion sensor 136 has a sensing element which detects acceleration from motion and/or gravity. The sensor generates and outputs an electrical signal representative of the detected acceleration. Changes in movement of the portable electronic device 100 results in changes in acceleration which produce corresponding changes in the electrical signal output of the sensor. The motion sensor 136 may be an accelerometer such as a three-axis accelerometer having three mutual orthogonally sensing axes. The accelerometer detects changes in the acceleration of the portable electronic device 100. Other types of motion sensors, such as a proximity sensor and/or gyroscope, may be used by the motion detection subsystem in addition to, or instead of, the accelerometer.

Changes in acceleration, proximity and orientation detected by the accelerometer, proximity sensor and/or gyroscope may be interpreted by the portable electronic device 100 as motion of the portable electronic device 100. When the changes in acceleration, proximity and orientation are within threshold tolerance(s) of regularity or predictability, when the changes in acceleration, proximity and orientation match predetermined motion criteria (e.g., stored in the memory 110), the changes may be interpreted by the portable electronic device 100 as a pattern of motion. Multiple patterns of motion may be recognized by the portable electronic device 100.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software applications or programs 148 that are executed by the processor 102 and are typically stored in a persistent, updatable store such as the memory 110. Additional applications or programs 148 may be loaded onto the portable electronic device 100 through the wireless network 150, the auxiliary I/O subsystem 124, the data port 126, the short-range communications subsystem 132 or any other suitable subsystem 134. The applications 148 may include, but are not limited to, any one or combination of the following: a contacts application (also known as an electronic address book), a calendar application for scheduling appointments, a browser for browsing Web content or other content, a calculator, an email application for email messaging, an instant messaging (IM) application for instant messaging, a text messaging application for text messaging such as SMS (Short Message Service) or Multimedia Messaging Service (MMS) messaging, a device-to-device messaging application (sometimes known as PIN (personal identification number) messaging application), a phone application, task application or notepad application. A PIM application which integrates some of the above applications, such as the messaging applications, calendar applications, task and notepad applications, may be provided instead of individual applications in some embodiments.

The memory 110 also includes a text entry control 162, a number of databases 164 each containing data objects of the same type, each associated with the same application 148 or both, and a parsing function 166, the functions of which are described more fully below. The text entry control 162 and parsing function 166 may each be part of the operating system 146 or may be separate applications 148. The text entry control 162 provides a text entry user interface on the display 112 for user interaction. The GUI, which may be part of the operating system 146, generates user interface screens comprising user elements and displays the user interface screens on the display in response to instructions from the operating system 146 and applications 148.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

FIG. 2 shows a front view of an example of a portable electronic device 100 in portrait orientation. The portable electronic device 100 includes a housing 200 that houses internal components including internal components shown in FIG. 1 and frames the touch-sensitive display 118 such that the touch-sensitive display 118 is exposed for user-interaction therewith when the portable electronic device 100 is in use. It will be appreciated that the touch-sensitive display 118 may include any suitable number of user-selectable features rendered thereon, for example, in the form of virtual buttons for user-selection of, for example, applications, options, or keys of a keyboard for user entry of data during operation of the portable electronic device 100. While the shown portable electronic device 100 is a "bar" or "brick" style device, the present disclosure is intended to capture all types of form factors including, but not limited to, slider-style and flip-style devices.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a centre of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected. The centre of the area of contact of each touch is commonly referred to as the touch point or centroid. It will be appreciated that during a touch event the touch point moves as the object detected by the touch-sensitive display 118 moves.

The actuator(s) 120 may be depressed by applying sufficient force to the touch-sensitive display 118 to overcome the actuation force of the actuator 120. The actuator 120 may be actuated by pressing anywhere on the touch-sensitive display 118. The actuator 120 may provide input to the processor 102 when actuated. Actuation of the actuator 120 may result in provision of tactile feedback.

The auxiliary I/O subsystems 124 could include other input devices such as one or more control keys, a keyboard or keypad, navigation device, or any combination thereof. The navigation device may be a depressible/clickable trackball, a depressible/clickable scroll wheel, a touch-sensitive optical trackpad, or a touch-sensitive touchpad.

Figure 3:
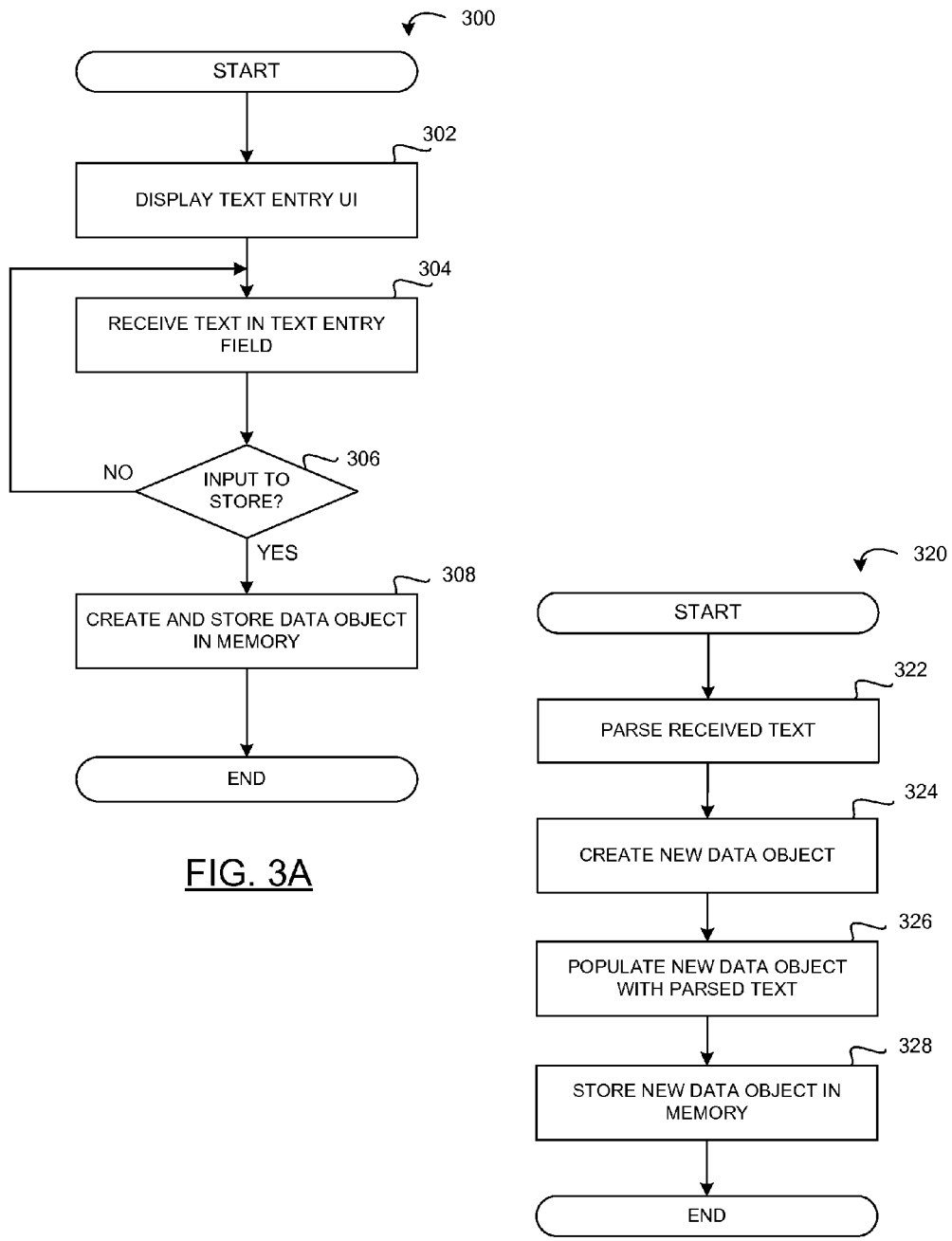
FIG. 3A is a flowchart of a method for text entry on a portable electronic device in accordance with one embodiment of the present disclosure.
FIG. 3B is a flowchart of a method for storing quick text entry on a portable electronic device in accordance with one embodiment of the present disclosure.

A flowchart illustrating one example embodiment of a method 300 for text entry on a portable electronic device is shown in FIG. 3A. The method 300 may be carried out by software executed, for example, by the processor 102. Coding of software for carrying out such a method 300 is within the scope of a person of ordinary skill in the art provided the present disclosure. The method 300 may contain additional or fewer processes than shown and/or described, and may be performed in a different order. Computer-readable code executable by at least one processor 102 of the portable electronic device 100 to perform the method 300 may be stored in a computer-readable medium such as the memory 110.

The portable electronic device 100 displays a text entry user interface on the display 112 (302) for user interaction. The text entry user interface includes a text entry field which may be populated with text by a user. Text input in the text entry field is processed by the text entry control 162. The text entry user interface is an element of the GUI of the portable electronic device 100 which allows text to be quickly entered and stored on the portable electronic device 100. The text entry user interface may be a widget in some embodiments. A widget is a GUI building-block which, when called by an application 148 or the operating system 146, processes and manages available interactions with the particular type of data or information. A text entry widget provides a single interaction point for quick text entry for a number of applications 148. Typically, all applications 148 on the portable electronic device 100 which allow for quick text entry may utilize a shared widget and invoke the same widget. The text entry user interface may be a permanent part of the home screen of the portable electronic device 100, or may be invoked and closed on demand.

In some embodiments, the text entry user interface may be invoked at any time when any application 148 is active on the portable electronic device 100. The text entry user interface may be invoked in response to designated input such as, for example, a designated button or designated key in a keyboard (e.g., a "hot key"), a designated touch gesture, a touching a designated onscreen item, a designated motion gesture or other suitable input. The text entry user interface may, in some embodiments, be invoked when the home screen is displayed on the display 112 by starting to type any text using a keyboard of the portable electronic device 100, or possibly a virtual keyboard of the portable electronic device 100.

The processor 102 causes the text entry user interface to be displayed on the display 112 in response to detecting the designated input when the text entry user interface is not currently displayed. Conversely, the processor 102 causes the text entry user interface to be hidden in response to detecting the designated input when the text entry user interface is currently displayed. The designated input acts as a display/hide toggle for the text entry user interface. When the text entry user interface is displayed, the text entry user interface is typically a pop-up or overlay user interface which overlays the current user interface screen which was displayed on the display 122 when the text entry user interface was invoked.

Alternatively, when the text entry user interface is part of the home screen, invoking the text entry user interface causes the home screen to be displayed and the text entry user interface to become the active element of the GUI of the portable electronic device 100.

Figure 4:
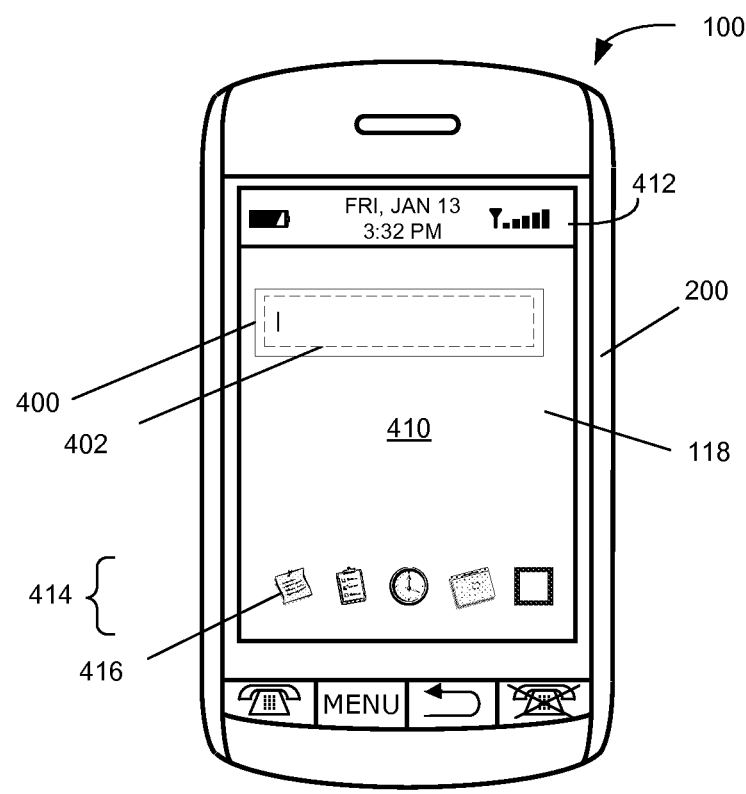
FIG. 4 is a front view of the portable electronic device of FIG. 2 in portrait orientation and displaying a home screen with a text entry user interface in accordance with one example embodiment of the present disclosure.

FIG. 4 illustrates one example of a text entry user interface 400 for quick text entry. The text entry user interface 400 includes a text entry field 402, also known as a text box, for receiving text in the form of an input string comprising one or more characters, such as alphanumerical characters and symbol characters. Text input in the text entry field 402 is processed by the text entry control 162. The text entry user interface 400 is part of the home screen 410 of the portable electronic device 100 in the shown example. The home screen 410 is a user interface screen of the GUI which provides the primary user interface component for interacting with the portable electronic device 100. The home screen 410 allows user to navigate menus to locate interaction points such as commands, functions, device settings and applications 148 which may be launched on the portable electronic device 100.

The text entry user interface 400 occupies only a portion of a display area of the display 112. The text entry user interface 400 may be located anywhere on the display 112 and may be of varying size. Typically, the text entry user interface 400 is located for convenient navigation, for example, by corresponding input via the touch-sensitive display 118 or navigation device 122. The text entry user interface 400 is provided along with other content of the home screen 410 such as a status bar 412 and icon menu 414. The status bar 412 displays information such as the current date and time, icon-based notifications, device status and/or device state. The icon menu 414 displays a plurality of icons 416 (only one of which is labelled in FIG. 4).

The GUI elements on the home screen 410, such as the icons 416, are each selectable to cause an associated action be performed. The action may be, for example, launching an associated command, function, application 148 or menu, or opening an associated folder. The icons 416 may be used, for example, to select the contacts application, email application, calendar application, notepad application, or other application 148. A user may select a GUI element, such as an application 148 to be launched, by highlighting or focusing the GUI element, such as an icon 416 associated with the respective application 148, by touching the touch-sensitive display 118 at a location corresponding to the GUI element, or by moving an onscreen position indicator, commonly referred to as a caret, cursor or focus, using the navigation device 122 to the location corresponding to the GUI element.

Double tapping the touch-sensitive display 118 at the location corresponding to the GUI element (e.g., icon 416), or clicking on or depressing the navigation device 122 when the GUI element (e.g., icon 416) is highlighted or focussed by the onscreen position indicator causes the action logically associated with the GUI element to be performed. If the GUI element (e.g., icon 416) represents an application 148, the processor 102 causes the application 148 logically associated with the icon 416 to be launched, for example, the email application.

Referring again to FIG. 3A, the text entry field 402 of the text entry user interface 400 receives text in the form of an input string of one or more characters (304), such as alpha-numerical characters and symbol characters. The text entry user interface 400 is caused to be the active GUI element before any text will be received by the text entry field 402. Invoking the text entry user interface 400 automatically causes the text entry user interface 400 to be the active GUI element without further input. Otherwise, when the text entry user interface 400 is part of the home screen 410, designated input selecting the text entry user interface 400 causes the text entry user interface 400 to be the active GUI element. The text entry user interface 400 may be selected by highlighting or focusing the text entry user interface 400 by touching the touch-sensitive display 118 at a location corresponding to the text entry user interface 400, or by moving the onscreen position indicator to the location corresponding to the text entry user interface 400. When the text entry user interface 400 is the active GUI element, a cursor is located within the text entry field 402. The cursor 323 is an onscreen indicator used to navigate between character positions within the text entry field 402 and delete characters in response to backspace input from a corresponding key of a mechanical or onscreen keyboard.

Alternatively, when the text entry user interface 400 is a permanent aspect of the home screen 410 the text entry user interface 400 may be set as the active GUI element by default such that, any key input from a keyboard of the portable electronic device 100 while the home screen 410 is displayed on the display 112 is automatically input into the text entry field 402. When the portable electronic device 100 has a touch-sensitive display 118 but no keyboard, or the keyboard is hidden (e.g., when the keyboard is a slider-style keyboard) or otherwise inactive or inaccessible, any input received via an onscreen ("virtual") keyboard invoked on the touch-sensitive display 118 while the home screen 410 is displayed on the display 410 is automatically input into the text entry field 402. The default setting by which the text entry user interface 400 is set as the active GUI element may be changed via designated input.

Figure 5:
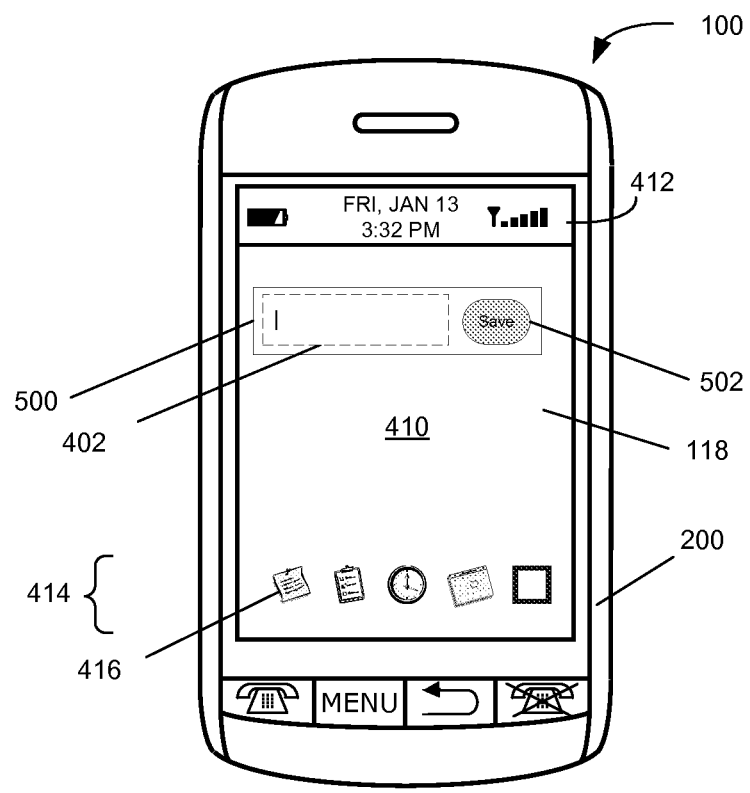
FIG. 5 is a front view of the portable electronic device of FIG. 2 in portrait orientation and displaying a home screen with a text entry user interface in accordance with another example embodiment of the present disclosure.

The portable electronic device 100 monitors for and detects designated input to store (e.g., "Save") the text received in the text entry field 402 (block 306). The designated input to store the received text may be a hot key, a designated touch gesture, a touching a designated onscreen item, a designated motion gesture, or other suitable input. The input may be, for example, pressing the "ENTER" key of a keyboard of the portable electronic device 100. FIG. 5 illustrates another example of a text entry user interface 500 for quick text entry. The text entry user interface 500 includes a "Save" button 502 next to the text entry field 402. Double tapping the touch-sensitive display 118 at the location corresponding to the "Save" button 502, or clicking on or depressing the navigation device 122 when the "Save" button 502 is highlighted or focussed by the onscreen position indicator causes the text received in the text entry field 402 to be stored in the memory 110 of the portable electronic device 100.

The text received in the text entry field 402 is stored as a data object of a predetermined type (e.g., format) in correspondence an application 148 associated with the received text and optionally the content of the received text. For example, the received text may be stored as an appointment or other calendar object accessible by a calendar application on the portable electronic device 100, or a note or memo object accessible by a notepad or memo application on the portable electronic device 100. The associated application 148 may be a predetermined or dynamically determined in accordance with user input or the content of the received text, as described more fully below.

The text entry control 162 interacts with the operating system 146, applications 148, databases 164 and parsing function 166 using a number of application programming interfaces (APIs). The text entry control 162 can interact with the operating system 146, databases 164 and parsing function 166 and at least some of the other applications 148, possibly all of the other applications 148, using the APIs. The APIs may be used by the text entry control 162 to determine the data type, data structure (e.g., format), naming conventions and location of database(s) associated with the applications 148, among other uses. The APIs may include specifications for routines, data structures, data object classes and protocols.

APIs may be provided for each data type supported by the text entry control 162. For example, APIs may be provided to generate contacts, appointments, memos, tasks, emails, text messages, instant messages (IMs), etc. The data stored on the portable electronic device 100 may be organized, at least partially, into a number of databases 164 (FIG. 1) each containing data objects of the same type, each associated with the same application 148, or both. For example, data objects such as contacts, appointments, memos, tasks, emails, text messages and IMs may be stored in individual databases within the memory 110. The application(s) 148 associated with each database 164 is stored, for example in a data table, and accessible to the text entry control 162 and other applications 148. The databases 164 act as data stores for data objects associated by type and application 148, and do not necessarily have any formal organizational structure. The particular databases 164 resident on the portable electronic device 100 depends on the particular applications 148 and capabilities of the portable electronic device 100. The text entry control 162, using the APIs of the respective applications 148, can generate and store data objects such as contacts, appointments, memos, tasks, emails, text messages and IMs, among other data objects.

Referring again to FIG. 3A, a new data object is generated and stored in the memory 110 of the portable electronic device 100 for the received text in response to the designated input to store (308). An example method 320 for generating and storing a data object is shown in FIG. 3B. The method 320 may be carried out by software executed, for example, by the processor 102. Coding of software for carrying out such a method 320 is within the scope of a person of ordinary skill in the art given the present disclosure. The method 320 may contain additional or fewer processes than shown and/or described, and may be performed in a different order. Computer-readable code executable by at least one processor 102 of the mobile terminal 100 to perform the method 320 may be stored in a computer-readable medium such as the memory 110.

The text received in the text entry field 402 of the text entry user interface is parsed using a parsing function 166, which parses the received text using one or more parsing techniques such as, for example, top-down or bottom-up parsing techniques (322). The first step of the parsing process is lexical analysis (or token generation). Lexical analysis is performed by a program called a lexer which separates the received text into a series of string sequences (called tokens) using a set of rules defined by the lexer. Each string sequence is a language object such as a word, word fragment or symbol. A word fragment is a short string of characters, for example one to three characters in length, which represent parts or words, abbreviations or acronyms. The rules are usually called regular expressions and define the set of possible character sequences that are used to form individual tokens. Delimiter inputs, such as space characters, are also defined by a regular expression and influences the recognition of other tokens but does not itself define a token.

Different rules may be applied depending on the associated application 148, the type of data object, or both. For example, rules defining data fields of each data object may be defined and applied to more accurately parse the received text. For example, when the data type is a contact or the associated application 148 is the contacts application, the parsing function may identify a 10-character string of numbers as a phone number, and may identify a string of alphabetic characters of any length (though there may be a maximum number of characters) as a contact name.

The next step is syntactic analysis (or syntactic parsing) which checks the token sequence to determine if it forms an allowable expression. This is usually done with reference to a context-free grammar which recursively defines elements which can make up an expression and an order in which the elements must appear in the token sequence to form an allowable expression. When the token sequence does not form an allowable expression, the token sequence is reformulated as allowable expression. When the token sequence forms an allowable expression, the token sequence proceeds to the final step of the parsing process.

The final step is semantic parsing (or semantic analysis) which determines how the token sequence is to be used by the associated application 148 and adds any required semantic information, for example, relating to the type of data object to be generated. The semantic information may also relate to data types of the tokens to be added which will form part of the data object.

Next, a new data object is generated, typically in RAM 108. The type of data object is determined in accordance with the associated application 148 and optionally the parsed text (324). The data object may be, but is not limited to, a contact, appointment, memo, task, email, text message, or IM. A default data type may be defined for each associated application 148, which may be changed by the user. The default data type may be override in favour of a specific data type based on the content of the received text, or possibly other input.

The parsed may be analysed to determine the associated application 148, data object, or both based on characteristics of the parsed text. For example, if the received text is parsed and a string of ten numbers is identified within the received text, the text entry control 162 may determine that the associated application is the contacts application and the data object to be generate is a new contact record, and then proceeds to generate that new contact record. Alternatively, if the received text is parsed and a string comprised only of alphabetic characters is identified within the received text, the text entry control 162 may determine that the associated application 148 is the notepad application and the data object to be generated is a new note, and then proceeds to generate that new note. Alternatively, the data object may be generated before parsing the received text in which case the content of the received text is not used in determining the type of data object.

Next, the new data object is populated in accordance with the parsed text. The data object may have a particular structure or schema (326) which may include one or more data fields. The portable electronic device 100 uses the parsed text to populate the data fields of the new data object.

Next, the populated data object is stored in the memory 110 of the portable electronic device 100, for example in an appropriate database 164 in accordance with the data object type, associated application 148 or both (328). The data objects, once stored in memory 110, may be viewed and/or edited at a later time using the associated application 148. The method 320 for generated and storing a data object is typically performed without any changes to the GUI of the portable electronic device 100.

Table 1, shown below, provides examples of how text received by the text entry control 162 may be parsed to generate different data objects for different applications.

TABLE 1

| | Example Received Text | | |
|---|---|---|---|
| | Text received in the 'text entry field' | Application | Populate data object |
| 1 | Hank5195551234 | Contacts | Name: Hank<br>Phone Number: (519) 555-1234 |
| 2 | 5195551234 | Contacts | Name: New Unknown [Timestamp]<br>Phone Number: (519) 555-1234 |
| 3 | Gym530am | Calendar | Subject: Gym<br>Start: 5:30 AM<br>Duration: [default]<br>Reminder: [default] |
| 4 | Buy coffee | Notepad | Title: Buy coffee<br>Contents: [empty] |

In the first example, the text 'Hank5195551234' is received in the text entry field 402. In this example the associated application 148 is the contacts application so a new contact record is generated. Because the associated application 148 is the contacts application, the parsing function 166 parses the received text in accordance with rules for the contact data type. The received text is a string of four letters followed by ten numbers which the parsing function 166 identifies as two string sequences, 'Hank' and '5195551234', which are determined to be a name and a phone number. The processor 102 then populates the 'Name' field with the text 'Hank' and populates the 'Phone Number' field with the text '5195551234'. The other fields of the contact record are left empty. There is no further text so the parsing function 166 does not need to parse further.

In the second example, the text '5195551234' is received in the text entry field 402. In this example the associated application 148 is the contacts application so a new contact record is generated. Because the associated application 148 is the contacts application, the parsing function 166 parses the received text in accordance with rules for the contact data type. The receive text is a string of ten numbers which the parsing function 166 identifies as a phone number, and then populates the 'Phone Number' field with the text '5195551234'. The 'Name' field and other fields of the contact record are left empty. There is no further text so the parsing function 166 does not need to parse further.

In the third example, the text 'Gym530am' is received in the text entry field 402. In this example the associated application 148 is the calendar application and the type of data object is a calendar data object. The calendar data object includes the fields 'Subject', 'Start', 'Duration' and 'Reminder'. Because the associated application 148 is the calendar application, the parsing function 166 parses the received text in accordance with rules for the calendar data type.

The parsing function 166 parses the received text into the two text strings 'Gym' and '5:30am' which the parsing function 166 identifies as a subject for the 'Subject' field and a start time for a 'Start' field, and populates the 'Subject' field with the text 'Gym' and the 'Start' field with the text '5:30am'. The value of the other fields of the calendar data type may be populated with default values or may be populated with automatically determined (e.g., calculated) values. For example, the value of the 'Duration' field and 'Reminder' field may be set to default values. A 'Date' field or subfield of the calendar data type may be automatically determined. For example, the value of the 'Date' field may be set to the current day or the next day (for example, if the start time for the current day is in the past). The text received in the text entry field 402 may be sufficiently defined so that each of the 'Subject', 'Start', 'Duration' and 'Reminder' fields are defined and populated with text from the received text rather than default values or calculated values.

In the fourth example, the text 'Buy coffee' is received in the text entry field 402. In this example the associated application 148 is the notepad application so a new 'Note' data object is generated. The 'Note' data object includes the fields 'Title' and 'Contents'. Because the associated application 148 is the notepad application, the parsing function 166 parses the received text in accordance with rules for the 'Note' data type. The parsing function 166 may identify the first text string as the text for 'Title' field and may identify the second text string as the text for the 'Content' field. In this example, the text 'Buy coffee' may be populated in the 'Title' field and the 'contents' field is left empty. Alternatively, both the 'Title' field and the 'Content' field may be populated with the text 'Buy coffee'.

The data objects described above are merely examples. Other data objects may be used and the data objects described herein may have different data fields than those specified above. Similarly, the parsing function 166 may parse the received text differently than as described in the above examples.

A reminder event may be generated after the newly generated data object is stored in the memory 110, for example, to display reminder notification to remind the user to review and/or complete the newly generated data object at a later time. In some embodiments, the text entry control 162 may analyze the populated data object to determine whether any data fields in the newly generated data object is empty, and generate a reminder event when the text entry control 162 determines that a data field in the data object is empty. The reminder event may be generated when the data object is incomplete. The data object may be considered incomplete when one or more predetermined fields are empty (e.g., fields required to properly define the data object), or if any field is empty depending on the embodiment. The reminder generates a reminder notification including a reminder message to be displayed on the display at a specified time. The specified time (e.g., start time) may be automatically determined as a predetermined time the next day (e.g., 8 am the day after the newly generated data object was generated) or a time which is a predetermined duration (e.g., 24 hours) from the time at which the newly generated data object was generated and stored.

The content of the reminder message may be fixed, or may be dynamically determined when the reminder event is generated using content from the newly generated data object, e.g. "Review (or Complete) 'Gym530am' appointment" from example 3 described above. The reminder notification may include a link to the newly generated data object which requires review and/or completion. Selecting the link causes the newly generated data object to be opened within an 'Edit' user interface (not shown) for editing the newly generated data object which is displayed on the display 112.

The 'Edit' user interface allows the user to edit the content of the newly generated data object. For example, the user may edit the default values or automatically determined values populated into the data object. For example, the user may change the value of the 'Date' field of a calendar data object from an automatically determined value (e.g., the current day or next day) to a particular date. An option to save and store any changes to the newly generated data object or cancel and disregard any changes to the newly generated data object may be provided by the 'Edit' user interface, after which the 'Edit' user interface is terminated and the 'Edit' user interface removed from the display 112.

The reminder event may be associated with a task in a task application, or an appointment in the calendar application. The reminder event may only be generated for designated applications such as, for example, the contacts or calendar applications. Device settings may allow the user to enable and/disable the use of reminder events, specify the applications 148 for which reminder events are to be generated and/or specify the conditions in which reminder events are to be generated.

At the start time of the reminder event, the reminder notification is displayed on the display 112. The reminder notification may include an option to "Dismiss" the reminder notification or "Snooze" the reminder notification for a duration of time (the Snooze duration), which may be configurable by the user at the time of the selecting. Dismissing the reminder notification permanently cancels the reminder notification, causing it to be removed from the display 112. Snoozing the reminder notification temporarily cancels the reminder notification, causing it to be removed from the display 112, and changing the start time of the reminder event such that it reoccurs at a later time in accordance with the Snooze duration.

Methods for determining the associated application 148 will now be described. The associated application 148 may be a predetermined application, may be dynamically determined in accordance with user input or may be dynamically determined in accordance with the content of the received text as described above. A predetermined application may be a default application such as, for example, the notepad application. Device settings may allow the user to change the default application.

Raw text entries received in the text entry field 402 may be stored in the notepad application (or other designated text processing application.) in addition to being stored in a data object readable by an associated application 148. Within the notepad application, raw, unparsed text entries may be stored in a single note or in separate notes depending on the embodiment. This provides a repository for all text entries via the text entry control 162 and may be useful, for example, if the user cannot remember which application 148 the text entry was sent to and the data object was generated in.

Figure 6B:
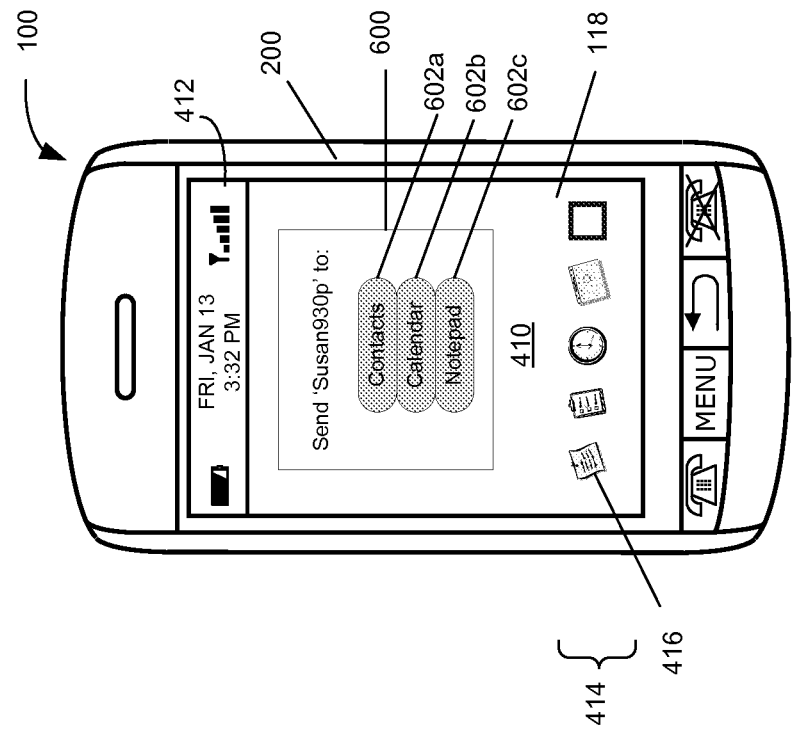
FIGS. 6A and 6B are front views of the portable electronic device of FIG. 2 in portrait orientation and displaying user interface screens used in selecting an associated application during quick text entry in accordance with one example embodiment of the present disclosure.
Figure 6A:
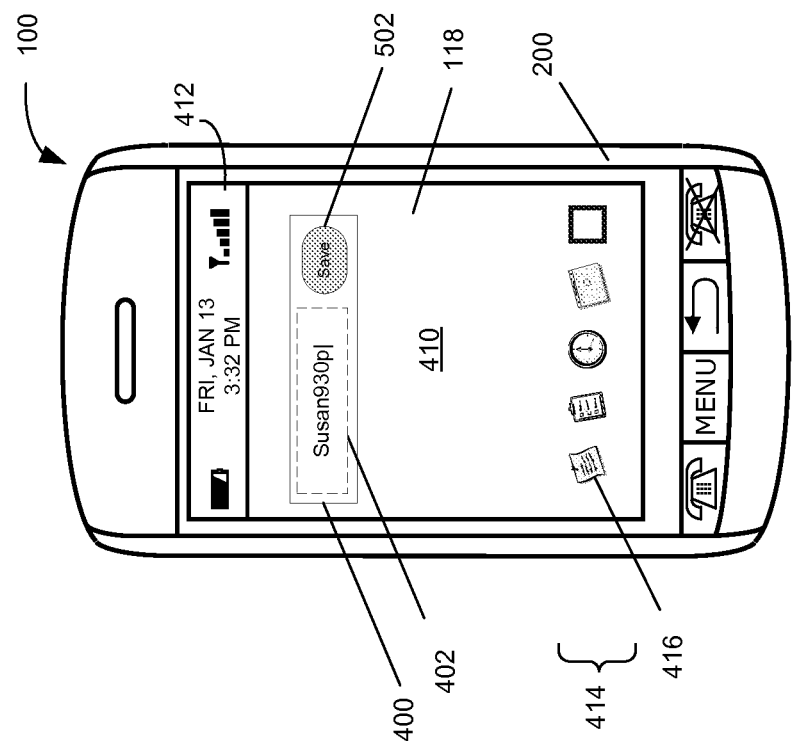

Selection of a particular input from a number of selectable onscreen inputs displayed on the display 122 in response to input to store the received text may provide the input for selecting an associated application 148. Each selectable onscreen input is mapped to a different application 148 on the portable electronic device 100. The received text will be stored to the application corresponding to the selected onscreen input. The onscreen inputs may be selected using any suitable input. FIGS. 6A and 6B show a series of user interface screens used in selecting an associated application during quick text entry in accordance with one example embodiment of the present disclosure. In FIG. 6A, the text string 'Susan930p' is input in the text entry field 402 of a text entry user interface 400 displayed on the display 112. When the "Save" button 502 is activated, or other designated input to store is received, an 'Application Selection' user interface window 600 is generated and displayed on the display 112.

In the shown example, the 'Application Selection' user interface window 600 displays a prompt with the text "Send 'Susan930p' to:" along with selectable onscreen inputs, such as selectable onscreen buttons 602a, 602b and 602c. The content of the prompt may vary between embodiments. The onscreen buttons 602a, 602b, 602c are mapped to the contacts, calendar and notepad applications respectively. In the shown example, the onscreen buttons 602a, 602b, 602c are located below the prompt but may be located elsewhere. In response to input selecting one of the onscreen buttons, the portable electronic device 100 stores the text string 'Susan930p' in accordance with the application 148 mapped to the selected onscreen button. Double tapping the touch-sensitive display 118 at the location corresponding to a particular onscreen button, or clicking on or depressing the navigation device 122 when the particular onscreen button is highlighted or focussed by the onscreen position indicator causes the received text in the text entry field 402 to be stored in the memory 110 of the portable electronic device 100 as a data object associated with the application 148 mapped to the particular onscreen button (e.g., as a data object of the type associated with the application 148 mapped to the particular onscreen button). For example, in response to selecting the 'Calendar' button 602b, the portable electronic device 100 will store the text string 'Susan930p' as a new calendar object associated with the calendar application.

The input may be selection of a particular input from a number of selectable onscreen inputs in the text entry user interface 400 itself. Each selectable onscreen input is mapped to a different application 148 on the portable electronic device 100. The received text will be stored to the application corresponding to the selected onscreen input. The onscreen inputs may be selected using any suitable input.

Figure 7:
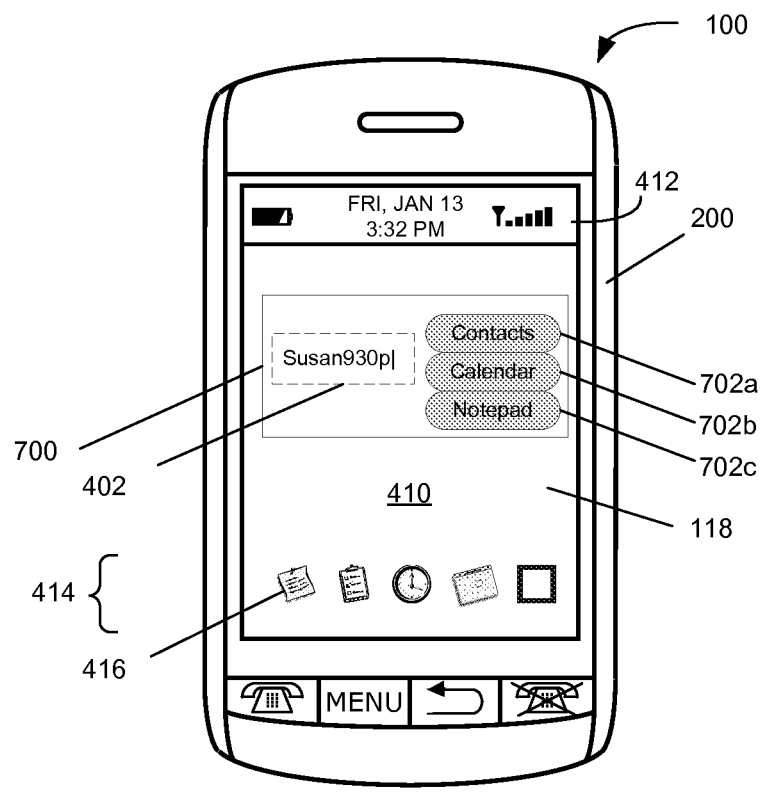
FIG. 7 is a front view of the portable electronic device of FIG. 2 in portrait orientation and displaying a home screen with a text entry user interface in accordance with a further example embodiment of the present disclosure.

FIG. 7 shows a text entry user interface 700 which selects an associated application during quick text entry in accordance with one example embodiment of the present disclosure. The text entry user interface 700 includes three selectable onscreen inputs in the form of onscreen buttons 702. In the shown example, the onscreen buttons 702 are located beside the text entry field 402 but may be located elsewhere. The onscreen buttons 702a, 702b and 702c are mapped to the contacts, calendar and notepad applications respectively.

In response to input selecting one of the onscreen buttons 702a, 702b or 702c, the portable electronic device 100 stores the text string 'Susan930p' in accordance with the application 148 mapped to the selected onscreen button 702a, 702b or 702c. Double tapping the touch-sensitive display 118 at the location corresponding of a particular onscreen button, or clicking on or depressing the navigation device 122 when the particular onscreen button is highlighted or focussed by the onscreen position indicator causes the received text in the text entry field 402 to be stored in the memory 110 of the portable electronic device 100 as a data object associated with the application 148 mapped to the particular onscreen button (e.g., as a data object of the type associated with the application 148 mapped to the particular onscreen button). The shown example eliminates the separate input to store the received text and provides the user with notice of the applications 148 with which the received text may be associated.

A confirmation message may be generated and displayed on the display 112 in response to storing the text. Referring again to the example in FIG. 6B, a new calendar object may be generated in response to designated input to store the received text 'Susan930p' received in the text entry field to the calendar application, e.g. double tapping the touch-sensitive display 118 at the location corresponding to the 'Calendar' button 602b, or clicking on or depressing the navigation device 122 when the 'Calendar' button 602b is highlighted or focussed by the onscreen position indicator. The new calendar object could also be generated when the calendar application is a predetermined application using the user interface screen shown in FIG. 6A, or when the calendar application is generated in response to selecting an onscreen button using the user interface screen shown in FIG. 7.

FIG. 8 illustrates one example confirmation message window 802 which includes the message text "New appointment 'Susan' at 9:30 pm tomorrow generated in Calendar". In shown example, the content of the message text is dynamically generated using content from the data object. However, content of the message text may vary. For example, the content of the message text may be fixed in other embodiments. For example, the message text may indicate the text inputted through the text entry field 402 has been stored to a particular application (e.g., the Calendar application), e.g. "New appointment generated in Calendar". The confirmation message window 802 may be displayed for a predetermined duration of time, for example 3 seconds, after the expiry of which the confirmation message window 802 is removed.

FIG. 9 illustrates another example confirmation message window 902 which includes the message text "New appointment generated in Calendar". The message text may vary. The confirmation message window 902 also includes selectable onscreen inputs, in the form of onscreen buttons 'OK' 904a, 'Cancel' 904b and 'Edit' 904c in the shown example. The onscreen buttons 904a, 904b, 904c are mapped to the 'Accept' command, 'Cancel' command, and 'Edit' command respectively. The 'Accept' command, 'Cancel' command or 'Edit' command is executed by the processor 102 in response to input selecting a respective one of the onscreen buttons 904a, 904b or 904c.

The 'Accept' command accepts the newly generated data object. The 'Cancel' command deletes the newly generated data object. The newly generated data object may be known, for example, if information describing the newly generated data object is maintained as a runtime variable of the method 320, for example, until selection input in response to the confirmation message window 902 has been received. Selection input in response to the confirmation message window 902 may be used to terminate the method 320. The 'Edit' command launches the 'Edit' user interface, which is displayed on the display 112, for editing the newly generated data object. The confirmation message window 902 is terminated and removed in response to selection input selecting any one of the 'Accept' command, 'Cancel' command or 'Edit' command.

While the present disclosure is described primarily in terms of methods, the present disclosure is also directed to a portable electronic device configured to perform at least part of the methods. The portable electronic device may be configured using hardware modules, software modules, a combination of hardware and software modules, or any other suitable manner. The present disclosure is also directed to a pre-recorded storage device or computer-readable medium having computer-readable code stored thereon, the computer-readable code being executable by at least one processor of the portable electronic device for performing at least parts of the described methods.

The present disclosure may be embodied in other specific forms without departing from its spirit or essential characteristics. The described embodiments are to be considered in all respects as being only illustrative and not restrictive. The present disclosure intends to cover and embrace all suitable changes in technology. The scope of the present disclosure is, therefore, described by the appended claims rather than by the foregoing description. All changes that come within the meaning and range of equivalency of the claims are intended to be embraced within their scope.

The invention claimed is:

1. A method for quick text entry, comprising:
   receiving text when a home screen is displayed, the home screen being a primary user interface providing interaction points for launching two or more applications;
   in response to receiving text when the home screen is displayed, displaying a text entry user interface within a graphical user interface, the text entry user interface including a text entry field, the text entry field being pre-populated with at least a portion of the received text, the text entry user interface being hidden from display on the home screen prior to receiving text at the home screen; and
   storing the text in the text entry field in memory in response to corresponding input to store the text.

2. The method of claim 1 wherein the storing comprises:
   generating a data object of a particular type in accordance with an associated application;
   populating the data object in accordance with the text in text entry field;
   storing the data object in the memory.

3. The method of claim 2 comprising selecting the associated application in accordance with received selection input selecting the associated application from a number of applications.

4. The method of claim 3 wherein the text entry user interface includes onscreen buttons for each application in the number of applications, the selecting input comprising input selecting an onscreen button corresponding to the associated application.

5. The method of claim 3 wherein the selecting input is the input to store the text.

6. The method of claim 3 comprising:
   displaying an application selection user interface window in response to the input to store the text, wherein the application selection user interface window includes onscreen buttons for each application in the number of applications, the selecting input comprising input selecting an onscreen button corresponding to the associated application.

7. The method of claim 2 comprising parsing the text in the text entry field, wherein the data object is populated with the parsed text.

8. The method of claim 7 wherein the particular type of data object is determined in accordance with the associated application and the parsed text.

9. The method of claim 7 wherein the data object includes a number of data fields, wherein at least one of data field of the data object is populated with at least a portion of the parsed text, and wherein one data field is populated with a default value or automatically determined value.

10. The method of claim 7 wherein the text in the text entry field is parsed in accordance with rules for the associated application when the associated application is predetermined.

11. The method of claim 7 wherein unparsed text in the text entry field is stored to a designated text processing application.

12. The method of claim 7 comprising selecting the associated application in accordance with characteristics of the text in the text entry field.

13. The method of claim 1 comprising generating a reminder event for the data object when the data object is incomplete, the reminder event causing a reminder notification including a reminder message to be displayed on the display at a specified time.

14. The method of claim 13 wherein the reminder message is dynamically generated using content from the data object.

15. The method of claim 13 wherein the reminder notification includes a link to the data object.

16. The method of claim 1 wherein the text entry user interface is hidden in response to designated input.

17. The method of claim 1 comprising displaying a confirmation message window on the display in response to the storing, the confirmation message window including message text.

18. The method of claim 17 wherein the content of the message text is dynamically generated using content from the data object.

19. The method of claim 18 wherein the confirmation message window includes onscreen buttons, one of the onscreen buttons for accepting the data object, one of the onscreen buttons for editing the data object, and one of the onscreen buttons for cancelling the data object, the method comprising performing an action associated with one of the onscreen buttons in response to selecting input selecting one of the onscreen buttons.

20. A portable electronic device comprising:
   a processor;
   a display and memory coupled to the processor;
   wherein the processor is configured for: receiving text when a home screen is displayed on the display, the home screen being a primary user interface providing interaction points for launching two or more applications; in response to receiving text when the home screen is displayed, causing a text entry user interface to be displayed within a graphical user interface on the display, the text entry user interface including a text entry field, the text entry field being pre-populated with at least a portion of the received text, the text entry user interface being hidden from display on the home screen prior to receiving text at the home screen; and storing the text in the text entry field in memory in response to corresponding input to store the text.

21. The method of claim 1, further comprising, after displaying the text entry user interface, receiving additional text in the text entry field.

* * * * *